(12) United States Patent
Shimizu et al.

(10) Patent No.: US 7,110,851 B2
(45) Date of Patent: Sep. 19, 2006

(54) NUMERICALLY CONTROLLED DEVICE

(75) Inventors: Toshio Shimizu, Tokyo (JP); Takahisa Tanaka, Tokyo (JP); Takeo Teshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 79 days.

(21) Appl. No.: 10/501,866

(22) PCT Filed: Feb. 20, 2003

(86) PCT No.: PCT/JP03/01834

§ 371 (c)(1),
(2), (4) Date: Jul. 20, 2004

(87) PCT Pub. No.: WO2004/074953

PCT Pub. Date: Sep. 2, 2004

(65) Prior Publication Data

US 2005/0113958 A1    May 26, 2005

(51) Int. Cl.
*G06F 19/00* (2006.01)
(52) U.S. Cl. ............................ 700/181; 700/86; 700/87
(58) Field of Classification Search ................ 700/181, 700/193, 169, 83, 86, 87–89, 180, 250, 251, 700/166, 179, 195, 194; 712/200
See application file for complete search history.

(56) References Cited

U.S. PATENT DOCUMENTS

| 4,740,901 | A | * | 4/1988 | Otsuki ........................ 700/195 |
| 5,485,069 | A | * | 1/1996 | Otsuki et al. ................ 318/570 |
| 5,581,467 | A | * | 12/1996 | Yasuda ........................ 700/193 |
| 6,290,403 | B1 | * | 9/2001 | Onishi et al. ................ 712/200 |
| 2005/0149224 | A1 | * | 7/2005 | Sakagami et al. ........... 700/188 |

FOREIGN PATENT DOCUMENTS

| JP | 64-87175 A | 3/1989 |
| JP | 5-46229 A | 2/1993 |
| JP | 2537325 Y2 | 3/1997 |

* cited by examiner

*Primary Examiner*—Kidest Bahta
(74) *Attorney, Agent, or Firm*—Sughrue Mion, PLLC

(57) ABSTRACT

In the processing preparation operation for checking a processing program and the tool compensation amount, a series of confirmation operations for all the tools are easily made using the processing program as conventionally used, without having limitations on the creation of the processing program. When a read skip signal 110 is externally input into a numerical control apparatus, the same instruction as stored in mandatory execution instruction storing means 104 is executed, when commanded in the processing program 100, until the same instruction as stored in read skip end instruction storing means 105 is commanded, but the other instructions are skipped, until the same instruction as stored in read skip end instruction storing means 105 is commanded. Then, when the instruction stored in the read skip end instruction storing means 105 is read, the instruction and subsequent instructions are executed.

9 Claims, 7 Drawing Sheets

| TOOL NUMBER | LONG SIZE | LONG WEAR | DIAMETER SIZE | DIAMETER WEAR |
|---|---|---|---|---|
| 1 | 1.120 | 0.000 | 1.020 | 0.000 |
| 2 | 2.020 | 0.000 | 1.900 | 0.000 |
| 3 | 0.000 | 0.000 | 0.000 | 0.000 |
| 4 | 4.002 | 0.020 | 3.055 | 0.100 |
| 5 | 0.000 | 0.000 | 0.000 | 0.000 |
| 6 | 3.021 | 0.000 | 2.003 | 0.000 |
| 7 | 0.000 | 0.000 | 0.000 | 0.000 |
| 8 | 0.000 | 0.000 | 0.000 | 0.000 |
| 9 | 0.000 | 0.000 | 0.000 | 0.000 |
| 10 | 0.000 | 0.000 | 0.000 | 0.000 |

| | MACHINE POSITION | RESIDUAL DISTANCE |
|---|---|---|
| X | 12.090 | 0.910 |
| Y | 15.000 | 0.000 |
| Z | 4.000 | 1.000 |
| B | 10.000 | 0.000 |

```
G00Y15.B10.;
G01X13.Z5.F2000;
   :    :
```

NUMERICALLY CONTROLLED DEVICE

TECHNICAL FIELD

The present invention relates to a numerical control (hereinafter referred to as an NC) apparatus, and more particularly to a processing program for the NC machine tool controlled by the NC apparatus and a processing preparation operation for checking the tool compensation amount.

BACKGROUND ART

The operator who operates the conventional NC apparatus performs a trial operation of a processing program using a single block and an override at the time of processing immediately after completing the set-up of the workpiece and the tool. At this time, the operator visually checks whether or not the correct tool is mounted in exchanging the tool. Then, when the tool approaches the workpiece, the operator once stops the tool prior to getting to the workpiece to confirm the residual movement amount displayed on the display screen of the NC apparatus. Moreover, the operator judges whether or not there is any problem with a tool number command (T command) of the processing program, a tool compensation number command (D number) of the processing program, and a tool offset number command (H number), a set value of the tool compensation amount, and a set value of the tool offset. If there is no problem, the operator checks the processing program to continue the processing.

However, in the case where a plurality of tools are commanded in one processing program, it was required to make the above confirmation for all the tools in the order. At this time, the operator accustomed to the operation may neglect the confirmation for all the tools, and perform the processing by mistaking the tool offset or the tool number. Furthermore, the tool is struck against the workpiece at the fast feed, damaging the bearings of the principal axis, or causing a burn-in of the principal axis to lead to a failure or breakage of the machine tool in some cases.

Thus, a method for overcoming this problem may be employed, in which the processing program is divided into every process of tool exchange, with the sequence number being attached to every divided process, whereby the above confirmation is made by searching the sequence number for each process.

Also, another method may be employed in which an optional stop instruction for temporarily suspending the execution of program is inserted into every process, and the above confirmation is made for each tool while interrupting the execution of program.

However, the method for searching the sequence number for each process had a problem that it took much labor to attach the sequence number to the portion to be searched, and further search the sequence number. Also, with this method, if the processing program for allowing the next tool to be ready at the standby position of a magazine in advance by commanding the next tool number during the execution of the current process in order to shorten the processing time, there was a problem that the processing program can not be checked, because the tool number is commanded before the location search by the sequence number.

Also, in the method for inserting the optional stop instruction into every process, the operator needed to confirm the end of each process one by one, and insert the optional stop instruction to give rise to a dead time.

DISCLOSURE OF THE INVENTION

This invention has been achieved in the light of the above-mentioned problems, and it is an object of the invention to provide an NC apparatus in which a series of confirmation operations for all the tools are enabled using a processing program as conventionally made without having limitations on fabrication of the processing program.

In order to accomplish the above object, a numerical control apparatus of the invention comprises read skip signal input means for commanding to skip execution of instructions up to a desired instruction in a processing program, read skip end instruction storing means for storing the desired instruction, and read skip means for skipping the execution of instructions until the same instruction as stored in the read skip end instruction storing means is commanded, if a read skip signal is input by the read skip signal input means.

Therefore, the execution of instructions is skipped up to the block where the read skip end instruction is commanded by an input of the read skip signal, whereby a series of confirmation operations for all the tools are easily performed by the input of the read skip signal without having limitations on the creation of the processing program, in other words, without changing the already created processing program to check the processing program.

For example, if a movement command to the tool exchange position is set in the read skip end instruction storing means, there is no dead time for adding and searching the sequence number.

Also, the numerical control apparatus of the invention further comprises mandatory execution instruction storing means for storing an instruction to be necessarily executed even when the execution of instructions is skipped, in which if a read skip signal is input by the read skip signal input means, the read skip means executes the same instruction as stored in the mandatory execution instruction storing means, when commanded in the processing program, after the instruction being executed in inputting the read skip signal up to commanding the same instruction as stored in the read skip end instruction storing means.

Therefore, if a tool number command (T code) is set in the mandatory execution instruction storing means, for example, the indexing of the tool is executed upon the tool number command issued in the skipped processing program, without a problem that that check can not be made even for the processing program commanding the next tool number during execution of the current process to shorten the processing time.

Also, in this invention, the read skip means executes an instruction stored in the read skip end instruction storing means when reading the instruction.

Therefore, if a movement instruction (G30) to the tool exchange position is set in the read skip end instruction storing means, for example, the movement instruction to the tool exchange position is executed immediately after the read skip, whereby there is no dead time for checking the next block.

Also, in this invention, the read skip means judges whether or not to stop the block in the next block after the same instruction as stored in the read skip end instruction storing means is commanded, depending on the presence or absence of a block stop outside signal or a block stop parameter setting, and when the block stop outside signal or the block stop parameter setting is present, the block is stopped in the next block after the same instruction as stored in the read skip end instruction storing means is commanded.

Therefore, the execution of instructions is skipped up to the block where the read skip end instruction is commanded, and a read skip completed state is selected as any one of a block stop state and a continued state, whereby the check is more reliable.

Also, in this invention, the read skip means interrupts execution of the block being executed at present, if a read skip signal is input by the read skip signal input means.

Therefore, if a read skip signal is input at a contact point between the workpiece and the tool, it is possible to confirm up to the contact point between the workpiece and the tool, whereby the check is made more correctly.

Also, in this invention, the read skip means does not update the coordinate information while a read skip process is being performed, but updates only the modal information.

Therefore, since the modal information is updated while the execution of instructions is skipped up to the block where the read skip end instruction is issued by the input of read skip signal, it is unnecessary to take into consideration the coordination of the modal information, even if the instructions are executed halfway on the process after the read skip, whereby the block executed subsequently after the end of read skip is checked in the almost same way as in no skipped state.

Also, in this invention, the read skip means is executed after executing a registered processing program if a read skip signal is input by the read skip signal input means.

Also, when the processing program for evacuating the tool is registered as the registered processing program, for example, it is possible to check the processing program safely by executing the processing program for evacuating the tool without causing a mechanical interference.

Also, in this invention, the read skip end instruction storing means has an optional instruction set with a parameter.

Therefore, the user can set the read skip end instruction optionally, whereby the above functions are very easily available to the user.

Moreover, in this invention, the mandatory execution instruction storing means has an optional instruction set with a parameter.

Therefore, the user can set the mandatory execution instruction optionally, whereby the above functions are very easily available to the user.

BRIEF DESCRIPTION OF THE DRAWINGS

FIG. 5 is a view showing an example of a processing program of the NC apparatus according to the embodiment 1 of the invention.

FIG. 6 is a view showing an example of a macro program of the NC apparatus according to the embodiment 1 of the invention.

FIG. 8 is a table showing one example of an NC apparatus screen according to the embodiment 1 of the invention.

BEST MODE FOR CARRYING OUT THE INVENTION

EMBODIMENT 1

An embodiment 1 of the present invention will be described below with reference to the accompanying drawings.

Figure 1:
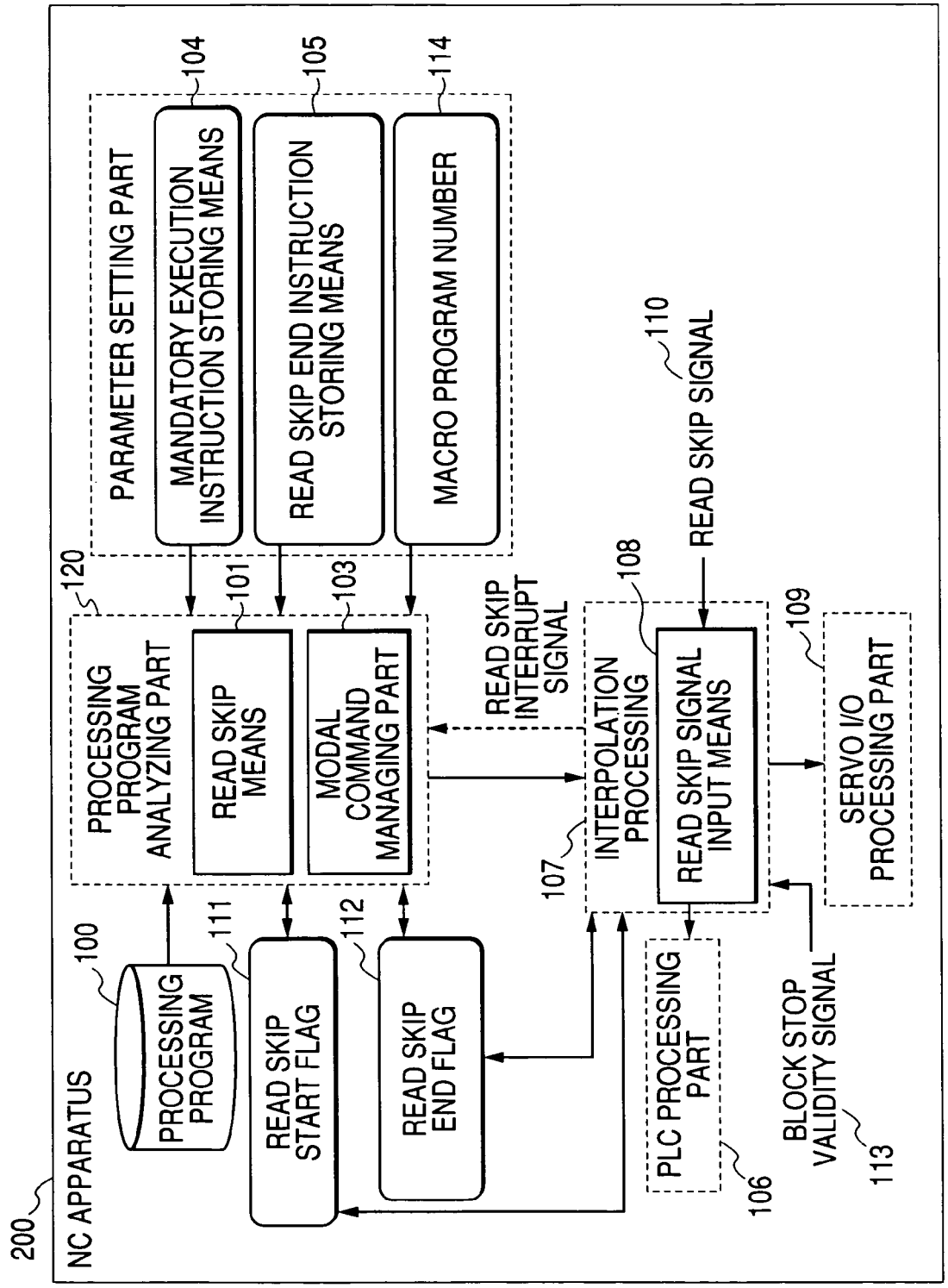
FIG. 1 is a block diagram showing one configuration example of an NC apparatus according to an embodiment 1 of the present invention.
Figure 7:
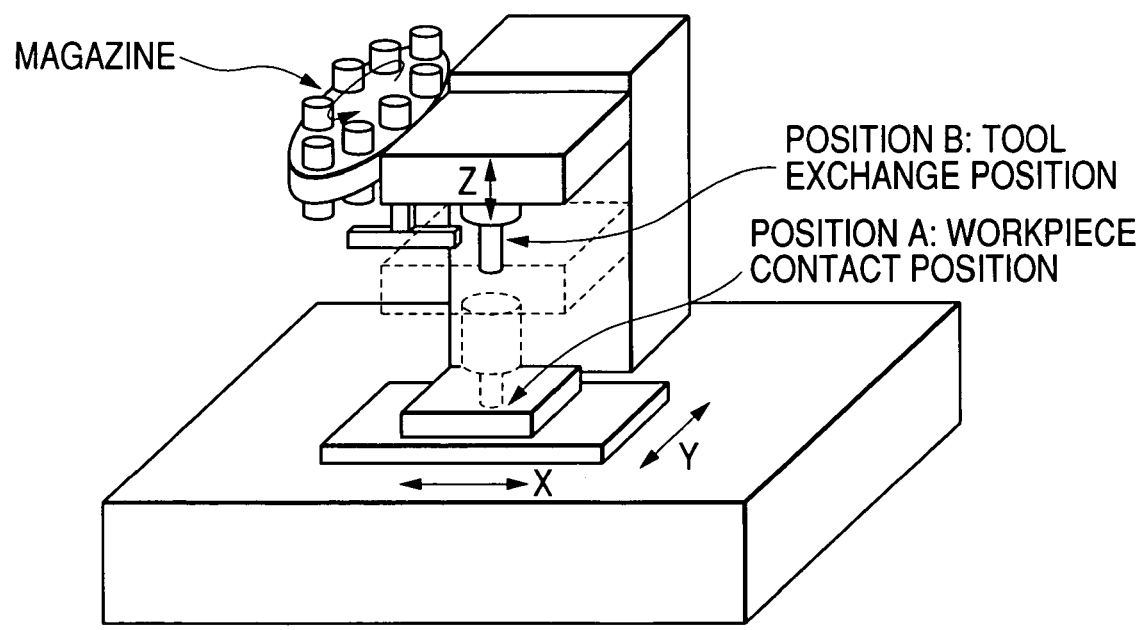
FIG. 7 is a schematic view of a machine constitution according to the embodiment 1 of the invention.

To assist an understanding of the embodiment 1, reference is made to an overall configuration block diagram of FIG. 1, the processing program examples of FIGS. 5 and 6, a schematic view of the machine constitution of FIG. 7 and a configuration example of an NC apparatus screen of FIG. 8 to describe a basic operation of the embodiment 1.

Herein, the machine constitution with a machining center as shown in FIG. 7 is supposed, and explained using an example of skipping instructions from the workpiece contact position at position A to the tool exchange position at position B as shown in FIG. 7 upon a read skip signal 110 in accordance with a processing program 100 of FIG. 5.

First of all, in a block having the sequence number N010 as described in the processing program 100 of FIG. 5, a magazine as shown in FIG. 7 is rotated beforehand to index the first tool. Then, to exchange the tool mounted on the principal axis at present for the first tool, the tool is exchanged in a block having the sequence number N030 after the principal axis is moved to the tool exchange position in a block having the sequence number N020. Then, to perform the actual processing, the positioning is made in the blocks having the sequence numbers N040 and N050, and the processing is started in a block having the sequence number N060. At this time, the operator decelerates the feed speed by setting the override value at a small value, checks whether or not the actually mounted tool is correct while confirming the tool number, compensation amount, and residual distance amount on a screen of the NC apparatus as shown in FIG. 8, and judge whether or not the cutting operation is normally performed by visually estimating the contact position with the workpiece or the residual movement amount in practice. If the operation has any problem, the portion with problem is corrected, and the same operation is performed again. If the operation has no problem, a read skip signal 110 is input by pressing a button provided on a machine operation panel of the NC control machine tool. A read skip end instruction is specified with G30 (command for returning to the second, third or fourth reference point (original point) as the machine intrinsic position via a specified intermediate point) as the parameter in advance, which is often employed in the movement to the tool exchange position, to skip the instructions up to the block having the sequence number N300 where G30 is actually commanded. At this time, a tool exchange command (T02) is specified in the mandatory execution instruction, whereby the T02 command in the block having the sequence number N100 is executed to index the second tool. Also, if the block having the sequence number N300 is immediately executed after skipping the instructions up to the block having the sequence number N300, there may be a mechanical interference, because the principal axis is still at the contact position with the workpiece. Therefore, the processing program 100 for evacuating the tool as shown in FIG. 6 is executed immediately after the read skip signal 110 is input, so that the tool is evacuated to the safe position. Thereby, the blocks following the sequence number N300 after executing the read skip are also performed safely.

The commands G30 and T02 are requisite for processing as shown in FIG. 7, but not issued in the processing program to check the processing program such as an optional stop instruction (M1) described in the column of prior art.

The details for making the control will be described below.

That is, FIG. 1 is a block diagram showing the overall configuration of an NC apparatus according to the embodiment 1 of the invention. The processing program 100 stored in the memory within the NC apparatus 200 is read one block after another by a processing program analyzing part 120, and analyzed by calculating the movement amount and speed. In an interpolation processing part 121 for making the interpolation at a certain period interval (e.g., 10 msec) based on the analyzed information, the movement amount per unit time for each axis is output, and passed through a servo I/O processing part 109 to the servo amplifier, not shown, to drive the servo motor.

Herein, an instance where the operator inputs a read skip signal 110 as an external signal during the execution of the block having the sequence number N060 is taken for explanation.

In the case where it is judged that the read skip signal 110 is on by read skip signal input means 108 within the interpolation processing part 121 that is performed at a regular period, the interpolation processing part 121 interrupts the block where the interpolation processing is being executed at present, and requests the processing program analyzing part 120 to analyze the processing program for the next block. Then, the processing program analyzing part 120 receiving a processing program analysis request causes the read skip means 101 to judge whether or not the next block is mandatory execution instruction (e.g., T command). When the mandatory execution instruction such as the block having the sequence number N100 is issued, the information for mandatory execution instruction is produced, and the interpolation processing part 121 is requested to execute the mandatory execution instruction. And the interpolation processing part 121 receiving the request executes the mandatory execution instruction in accordance with the block information of mandatory execution instruction, and requests the processing program analyzing part 120 to analyze the processing program for the next block again. Then, the processing program analyzing part 120 reads the next block again, and if the read skip means 101 judges that the next block is neither the mandatory execution instruction such as the block having the sequence number N110 nor the read skip end instruction, a modal command managing part 103 updates a modal command such as G00. And the next block is read and the processing program analysis processing is continued. Also, the processing program analyzing part 120 creates the block information of read block, and requests the interpolation processing part 121 to execute the interpolation processing, if the read skip means 101 judges that the read block is the read skip end instruction (e.g., G30 such as block having the sequence number N300). And the interpolation processing part 121 checks whether or not a block stop validity signal 113 is on, and if it is on, performs the current block and transfers to the block stop state. Also, if there is a registered macro program number 114 when the read skip signal 110 is turned on during the execution of the block having the sequence number N060, the read skip process may be performed after executing the program as shown in FIG. 5 and evacuating the tool.

Referring to a flowchart of FIGS. 2 and 3, a processing procedure of the embodiment 1 will be described. In the interpolation processing part 105 in which the processing is repeated at a regular interval (e.g., every 10 msec), it is discriminated whether or not the read skip signal 110 as the external signal is turned on (step S100). If the read skip signal 110 is on, a read skip start flag 111 is turned on (step S110), and a macro program processing as will be described later is performed (step S400). If the read skip signal 110 is off, the previous processing is not executed, and the current block is performed (step S150). Then, it is discriminated whether or not the read skip start flag 111 is on (step S120). If the read skip start flag 111 is on, it is discriminated whether or not the current block is the read skip end instruction stored in the read skip end instruction storing means 105 (step S130). Herein, if the current block is the read skip end instruction, the read skip start flag 111 is turned off (step S170). Subsequently, a read skip end flag 112 is turned on (step S180). Also, if the current block is not the read skip end instruction, it is discriminated whether or not the current block is the mandatory execution instruction stored in the mandatory execution instruction storing means 104 (step S140). Herein, if the current block is the mandatory execution instruction, the current block is performed (step S150). Also, if the current block is not the mandatory execution instruction, the current block is not performed, and the operation transfers to the next step. And at the next step, the modal information is updated by the current block (step S160). Then, it is discriminated whether or not the read skip end flag 112 is on (step S190). Herein, if the read skip end flag 112 is off, the operation returns to the top of the flowchart. Also, if the read skip end flag 112 is on, it is discriminated whether or not a block stop validity signal 113 is on (step S200). Herein, if the block stop validity signal 113 is on, the block stop processing is performed (step S210). However, if the block stop validity signal 113 is off, the block stop processing is skipped. Finally, the read skip end flag 112 is turned off and the operation is ended.

Figure 2:
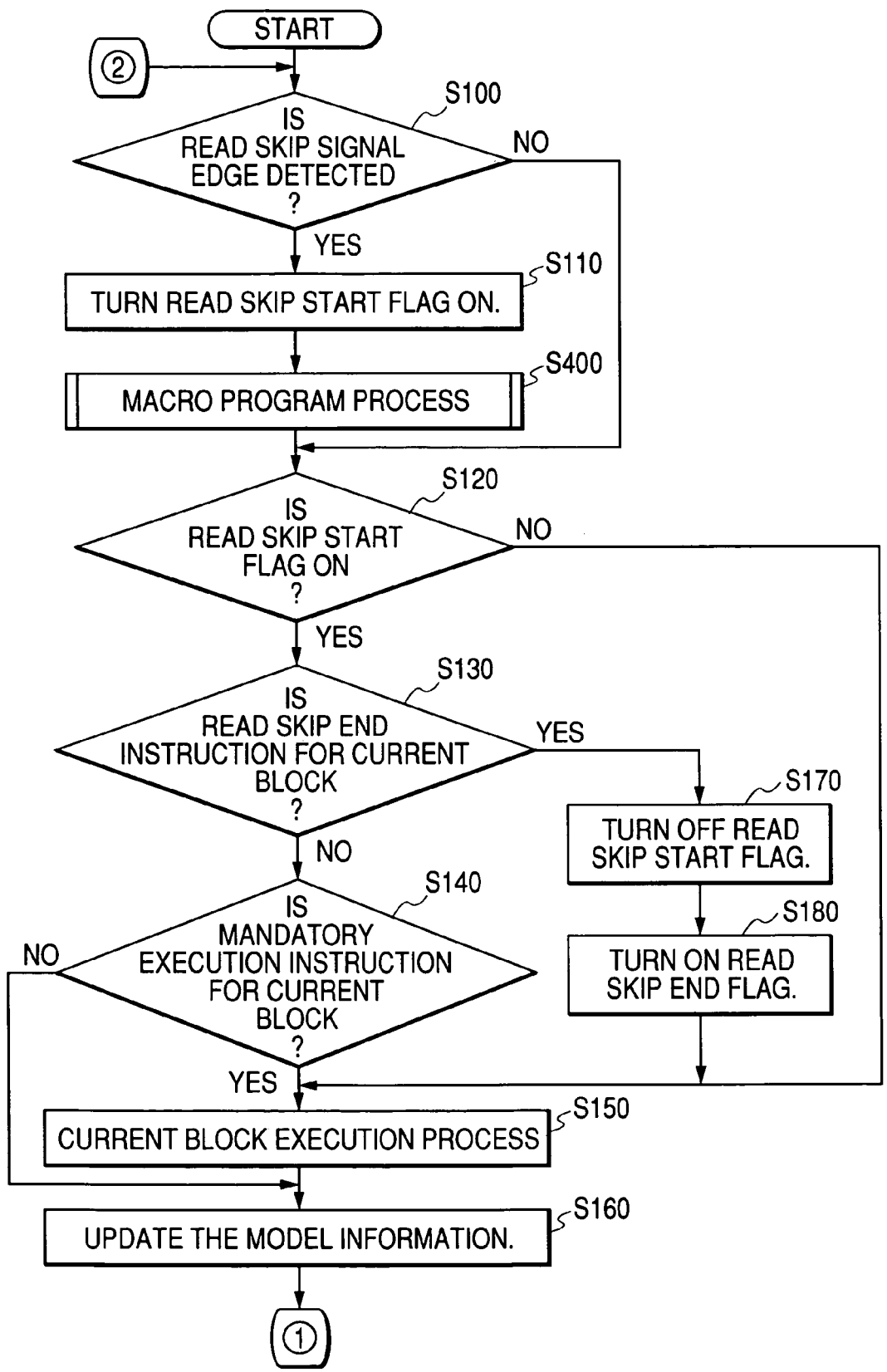
FIG. 2 is a flowchart showing a processing procedure of the NC apparatus according to the embodiment 1 of the invention.
Figure 3:
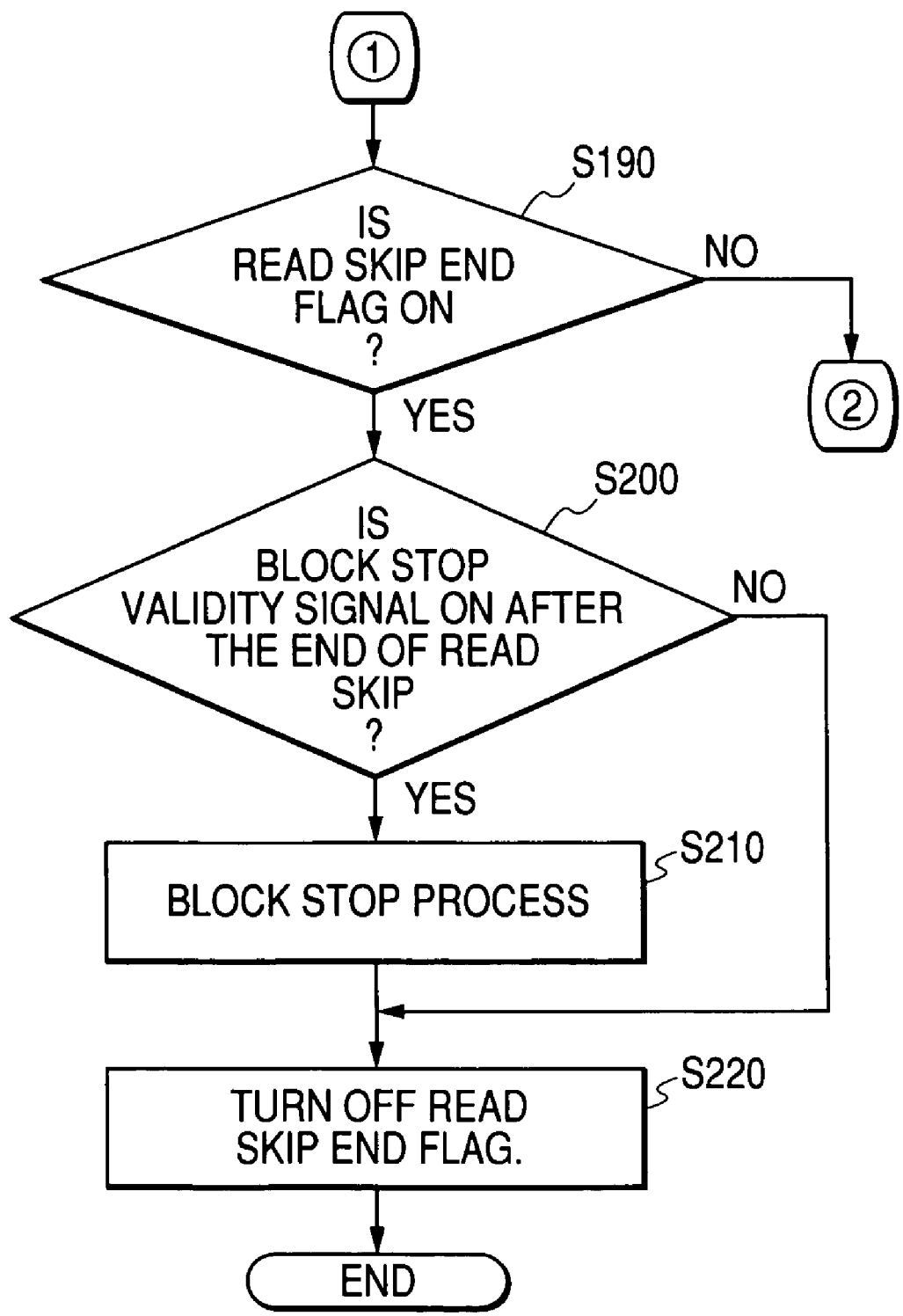
FIG. 3 is a flowchart showing a processing procedure of the NC apparatus according to the embodiment 1 of the invention.
Figure 4:
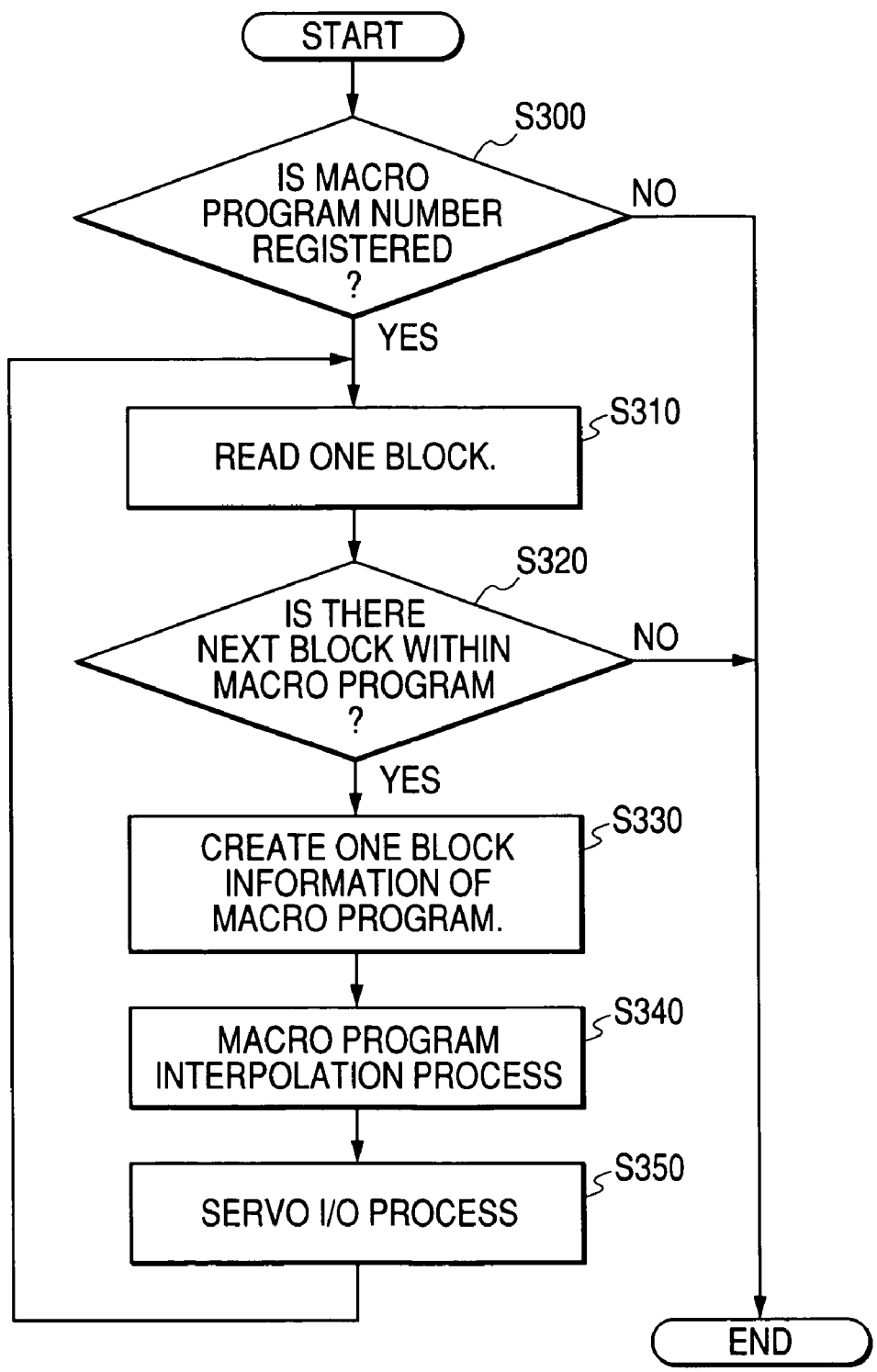
FIG. 4 is a flowchart showing a macro program processing procedure of the NC apparatus according to the embodiment 1 of the invention.

Referring now to a flowchart of FIG. 4, a macro program processing (step S400) of the flowchart as shown in FIG. 2 will be described. This macro program is employed when the tool is evacuated safely after executing the read skip, in which a macro program number 114 is registered in the parameter area. Herein, if it is discriminated whether or not the macro program number 114 is registered in the parameter area (step S300). Of the macro program number 114 is not registered, none is performed and the operation is ended. If the macro program number 114 is registered (step S310), it is discriminated whether or not the read block exists (step S320). If the read block does not exist, the operation is ended. Herein, if the block exists in the macro program, the block information is created (step S330), and the interpolation processing is performed (step S340). And the servo I/O processing is performed (step S350), and the next block is read again (step S310).

In this manner, in this embodiment 1, when the read skip signal 110 is input, the blocks are skipped until the read skip end instruction is issued. Thereby, it will be found that a series of confirmation operations for all the tools are easily made without having limitations on the creation of the processing program.

EMBODIMENT 2

In the previous description, the block stop operation is switched by employing the block stop validity signal 113. However, the block stop operation may be switched by employing the parameter, instead of the signal.

Also, in the previous description, the read skip end instruction is G30 command. However, when the macro is set to make a series of tool exchange operations by other commands, for example, T command, it may be changed to T command, whereby the same effects can be attained. As the read skip end instruction, a plurality of different commands may be registered collectively.

Also, in the previous description, the mandatory execution instruction is made using the tool number command (T). However, it may be changed to other commands, for example, the M command for pallet change, whereby the same effects can be attained. Also, as the mandatory execution instruction, a plurality of different commands may be registered collectively.

Moreover, when it is desired to register a plurality of tool number commands T1, T2, T3, as the mandatory execution instruction, they are not registered individually (by specifying T1, T2, T3, . . . ), but T may be only registered, thereby executing the tool number commands such as T1, T2, T3, . . .

INDUSTRIAL APPLICABILITY

As described above, the numerical control apparatus according to the invention is suitably employed to perform the processing preparation operation for checking the processing program for the NC machine tool and the tool compensation amount.

The invention claimed is:

1. A numerical control apparatus for controlling a drive unit for a machine tool making the processing by relatively moving a workpiece and a tool, comprising:
    read skip signal input means for commanding to skip execution of instructions up to a desired instruction in a processing program;
    read skip end instruction storing means for storing said desired instruction; and
    read skip means for skipping the execution of instructions until the same instruction as said instruction stored in said read skip end instruction storing means is commanded, if a read skip signal is input by said read skip signal input means.

2. The numerical control apparatus according to claim 1, further comprising mandatory execution instruction storing means for storing an instruction to be necessarily executed even when the execution of said instructions is skipped, in which if a read skip signal is input by said read skip signal input means, said read skip means executes the same instruction as stored in said mandatory execution instruction storing means, when commanded in said processing program, after the instruction being executed in inputting said read skip signal up to commanding the same instruction as stored in said read skip end instruction storing means.

3. The numerical control apparatus according to claim 1, wherein said read skip means executes an instruction stored in said read skip end instruction storing means when reading said instruction.

4. The numerical control apparatus according to claim 3, wherein aid read skip means judges whether or not to stop the block in the next block after the same instruction as stored in said read skip end instruction storing means is commanded, depending on the presence or absence of a block stop outside signal or a block stop parameter setting, and when said block stop outside signal or said block stop parameter setting is present, the block is stopped in the next block after the same instruction as stored in said read skip end instruction storing means is commanded.

5. The numerical control apparatus according to claim 1, wherein said read skip means interrupts execution of the block being executed at present, if a read skip signal is input by said read skip signal input means.

6. The numerical control apparatus according to claim 1, wherein said read skip means does not update the coordinate information while a read skip process is being performed, but updates only the modal information.

7. The numerical control apparatus according to claim 1, wherein said read skip means is executed after executing a registered processing program if a read skip signal is input by said read skip signal input means.

8. The numerical control apparatus according to claim 1, wherein said read skip end instruction storing means has an optional instruction set with a parameter.

9. The numerical control apparatus according to claim 1, wherein said mandatory execution instruction storing means has an optional instruction set with a parameter.

* * * * *